US008767941B1

(12) United States Patent
Smith et al.

(10) Patent No.: US 8,767,941 B1
(45) **Date of Patent: *Jul. 1, 2014**

(54) METHODS AND SYSTEMS FOR SPEED DIALING

(71) Applicant: Callwave Communications, LLC, Santa Barbara, CA (US)

(72) Inventors: Robert F. Smith, Santa Barbara, CA (US); Leland W. Kirchhoff, Santa Barbara, CA (US); Colin Kelley, Santa Barbara, CA (US); David S. Trandal, Santa Barbara, CA (US)

(73) Assignee: Callwave Communications, LLC, Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/031,368

(22) Filed: Sep. 19, 2013

Related U.S. Application Data

(63) Continuation of application No. 13/334,919, filed on Dec. 22, 2011, now Pat. No. 8,542,814, which is a continuation of application No. 11/740,550, filed on Apr. 26, 2007, now Pat. No. 8,085,922.

(60) Provisional application No. 60/796,441, filed on May 1, 2006.

(51) Int. Cl.

| | |
|---|---|
| ***H04M 3/42*** | (2006.01) |
| ***H04M 1/00*** | (2006.01) |
| ***H04M 3/00*** | (2006.01) |

(52) U.S. Cl.
USPC ............. 379/216.01; 379/355.01; 379/355.05

(58) Field of Classification Search
USPC .................. 379/216.01, 355.01, 355.05, 350, 379/201.01, 355.02, 355.07; 370/356, 352, 370/338, 351
See application file for complete search history.

(56) References Cited

U.S. PATENT DOCUMENTS

| | | | |
|---|---|---|---|
| 3,936,613 | A | 2/1976 | Nishigori et al. |
| 3,956,595 | A | 5/1976 | Sobanski |
| 4,009,337 | A | 2/1977 | Sakai et al. |

(Continued)

FOREIGN PATENT DOCUMENTS

| | | |
|---|---|---|
| CA | 1329852 | 9/1989 |
| EP | 1120954 | 8/2001 |

(Continued)

OTHER PUBLICATIONS

Article: "Widget MySpace Widget"; posted by 4INFO Bob; http://4info.typepad.com/blog/2006/09/widget_myspace_.html; Sep. 15, 2006; 3 pages.

(Continued)

*Primary Examiner* — Thjuan K Addy
(74) *Attorney, Agent, or Firm* — Knobbe, Martens, Olson & Bear LLP

(57) ABSTRACT

Systems and methods enable configuring and using speed dialing. A first user interface is displayed to a user, the first user interface providing a name field configured to display and/or receive a contact name and a phone address field configured to display and/or receive a phone address associated with the contact name. A speed dial field configured to receive and/or display a speed dial identifier associated with the phone address is provided. When the user later enters speed dial identifier via a telephone, the phone address is called.

34 Claims, 9 Drawing Sheets

(56) References Cited

U.S. PATENT DOCUMENTS

| | | | |
|---|---|---|---|
| 4,022,983 A | 5/1977 | Braun et al. | |
| 4,485,470 A | 11/1984 | Reali | |
| 4,736,405 A | 4/1988 | Akiyama | |
| 4,809,321 A | 2/1989 | Morganstein et al. | |
| 4,893,336 A | 1/1990 | Wuthnow | |
| 4,994,926 A | 2/1991 | Gordon et al. | |
| 5,040,208 A | 8/1991 | Jolissaint | |
| 5,046,087 A | 9/1991 | Sakai | |
| 5,291,302 A | 3/1994 | Gordon et al. | |
| 5,404,537 A | 4/1995 | Olnowich et al. | |
| 5,434,908 A | 7/1995 | Klein | |
| 5,459,584 A | 10/1995 | Gordon et al. | |
| 5,467,388 A | 11/1995 | Redd, Jr. et al. | |
| 5,526,524 A | 6/1996 | Madduri | |
| 5,533,102 A | 7/1996 | Robinson et al. | |
| 5,533,106 A | 7/1996 | Blumhardt | |
| 5,577,111 A | 11/1996 | Iida et al. | |
| 5,583,918 A | 12/1996 | Nakagawa | |
| 5,619,557 A | 4/1997 | Van Berkum | |
| 5,640,677 A | 6/1997 | Karlsson | |
| 5,651,054 A | 7/1997 | Dunn et al. | |
| 5,668,861 A | 9/1997 | Watts | |
| 5,751,795 A | 5/1998 | Hassler et al. | |
| 5,774,067 A | 6/1998 | Olnowich et al. | |
| 5,805,587 A | 9/1998 | Norris et al. | |
| 5,809,128 A | 9/1998 | McMullin | |
| 5,812,551 A | 9/1998 | Tsukazoe et al. | |
| 5,825,867 A | 10/1998 | Epler et al. | |
| 5,832,060 A | 11/1998 | Corlett et al. | |
| 5,835,573 A | 11/1998 | Dee et al. | |
| 5,894,504 A | 4/1999 | Alfred et al. | |
| 5,930,350 A | 7/1999 | Johnson | |
| 5,946,386 A | 8/1999 | Rogers et al. | |
| 5,960,064 A | 9/1999 | Foladare et al. | |
| 5,960,073 A | 9/1999 | Kikinis et al. | |
| 5,963,629 A | 10/1999 | Jung | |
| 5,995,594 A | 11/1999 | Shaffer et al. | |
| 5,995,603 A | 11/1999 | Anderson | |
| 6,014,436 A | 1/2000 | Florence et al. | |
| 6,032,051 A | 2/2000 | Hall et al. | |
| 6,034,956 A | 3/2000 | Olnowich et al. | |
| 6,035,031 A | 3/2000 | Silverman | |
| 6,044,059 A | 3/2000 | Olnowich | |
| 6,078,581 A | 6/2000 | Shtivelman et al. | |
| 6,104,800 A | 8/2000 | Benson | |
| 6,144,644 A | 11/2000 | Bajzath et al. | |
| 6,160,881 A | 12/2000 | Beyda et al. | |
| 6,167,127 A | 12/2000 | Smith et al. | |
| 6,169,795 B1 | 1/2001 | Dunn et al. | |
| 6,169,796 B1 | 1/2001 | Bauer et al. | |
| 6,175,622 B1 | 1/2001 | Chiniwala et al. | |
| 6,178,183 B1 | 1/2001 | Buskirk, Jr. | |
| 6,181,691 B1 | 1/2001 | Markgraf et al. | |
| 6,208,638 B1 | 3/2001 | Rieley et al. | |
| 6,212,261 B1 | 4/2001 | Meubus et al. | |
| 6,215,784 B1 | 4/2001 | Petras et al. | |
| 6,230,009 B1 | 5/2001 | Holmes et al. | |
| 6,243,378 B1 | 6/2001 | Olnowich | |
| 6,253,249 B1 | 6/2001 | Belzile | |
| 6,278,704 B1 | 8/2001 | Creamer et al. | |
| 6,304,565 B1 | 10/2001 | Ramamurthy | |
| 6,310,939 B1 | 10/2001 | Varney | |
| 6,350,066 B1 | 2/2002 | Bobo, II | |
| 6,353,660 B1 | 3/2002 | Burger et al. | |
| 6,353,663 B1 | 3/2002 | Stevens et al. | |
| 6,363,414 B1 | 3/2002 | Nicholls et al. | |
| 6,374,102 B1 | 4/2002 | Brachman et al. | |
| 6,405,035 B1 | 6/2002 | Singh | |
| 6,411,601 B1 | 6/2002 | Shaffer et al. | |
| 6,411,805 B1 | 6/2002 | Becker et al. | |
| 6,438,216 B1 | 8/2002 | Aktas | |
| 6,438,222 B1 | 8/2002 | Burg | |
| 6,477,246 B1 | 11/2002 | Dolan et al. | |
| 6,496,569 B2 | 12/2002 | Pelletier et al. | |
| 6,496,576 B2 | 12/2002 | Tanaka et al. | |
| 6,501,750 B1 | 12/2002 | Shaffer et al. | |
| 6,505,163 B1 | 1/2003 | Zhang et al. | |
| 6,510,162 B1 | 1/2003 | Fijolek et al. | |
| 6,510,417 B1 | 1/2003 | Woods et al. | |
| 6,512,930 B2 | 1/2003 | Sandegren | |
| 6,519,258 B1 | 2/2003 | Tsukazoe et al. | |
| 6,539,084 B1 | 3/2003 | Long | |
| 6,546,087 B2 | 4/2003 | Shaffer et al. | |
| 6,549,612 B2 | 4/2003 | Gifford et al. | |
| 6,553,222 B1 | 4/2003 | Weiss | |
| 6,564,264 B1 | 5/2003 | Creswell et al. | |
| 6,564,321 B2 | 5/2003 | Bobo, II | |
| 6,567,505 B1 | 5/2003 | Omori et al. | |
| 6,574,319 B2 | 6/2003 | Latter et al. | |
| 6,621,892 B1 | 9/2003 | Banister et al. | |
| 6,643,034 B1 | 11/2003 | Gordon et al. | |
| 6,658,100 B1 | 12/2003 | Lund | |
| 6,661,785 B1 | 12/2003 | Zhang et al. | |
| 6,662,232 B1 | 12/2003 | Nicholls et al. | |
| 6,690,785 B1 | 2/2004 | Stelter et al. | |
| 6,751,299 B1 | 6/2004 | Brown et al. | |
| 6,775,370 B2 | 8/2004 | Burg | |
| 6,782,088 B1 | 8/2004 | Gabara | |
| 6,785,021 B1 | 8/2004 | Gordon et al. | |
| 6,792,094 B1 | 9/2004 | Kirkpatrick | |
| 6,857,074 B2 | 2/2005 | Bobo, II | |
| 6,898,275 B2 | 5/2005 | Dolan et al. | |
| 6,914,977 B2 | 7/2005 | Danner et al. | |
| 6,968,174 B1 | 11/2005 | Trandal et al. | |
| 6,993,004 B2 | 1/2006 | Boys | |
| 7,003,087 B2 | 2/2006 | Spencer et al. | |
| 7,106,851 B2 * | 9/2006 | Tang et al. | 379/355.01 |
| 7,697,503 B2 | 4/2010 | Frederick | |
| 2002/0001303 A1 | 1/2002 | Boys | |
| 2002/0009184 A1 | 1/2002 | Shnier | |
| 2002/0010616 A1 | 1/2002 | Itzhaki | |
| 2002/0097710 A1 | 7/2002 | Burg | |
| 2003/0039339 A1 | 2/2003 | Luehrig et al. | |
| 2003/0063731 A1 | 4/2003 | Woodring | |
| 2003/0123629 A1 | 7/2003 | Hussain et al. | |
| 2003/0156700 A1 | 8/2003 | Brown et al. | |
| 2004/0028203 A1 | 2/2004 | Wurster et al. | |
| 2004/0190706 A1 | 9/2004 | Fleischer, III et al. | |
| 2004/0258220 A1 | 12/2004 | Levine et al. | |
| 2005/0053216 A1 | 3/2005 | Spencer et al. | |
| 2005/0123118 A1 | 6/2005 | Terry et al. | |
| 2005/0154599 A1 | 7/2005 | Kopra et al. | |
| 2005/0207556 A1 | 9/2005 | Gonzalez et al. | |
| 2005/0265322 A1 | 12/2005 | Hester | |
| 2006/0013374 A1 | 1/2006 | Fleischer, III et al. | |
| 2006/0114890 A1 | 6/2006 | Martin Boys | |
| 2006/0268007 A1 | 11/2006 | Gopalakrishnan | |
| 2007/0002077 A1 | 1/2007 | Gopalakrishnan | |
| 2007/0067738 A1 | 3/2007 | Flynt et al. | |
| 2007/0202898 A1 | 8/2007 | Bae et al. | |

FOREIGN PATENT DOCUMENTS

| | | |
|---|---|---|
| JP | 10-513632 | 12/1998 |
| JP | 11-506292 | 6/1999 |
| JP | 2001-168989 | 6/2001 |
| WO | WO 97/26749 | 7/1997 |
| WO | WO 00 60840 | 10/2000 |
| WO | WO 01/76210 | 10/2001 |

OTHER PUBLICATIONS

Article: Communications-SMS, Dashboard Widgets—Showcase; http://www.dashboardwidgets.com/showcase/details.php?wid=1082; Oct. 14, 2005; 2 pages.

Johnson, Dave; Article; "Now You're Talking—voice—response systems for home offices—Product Information"; http://www.findarticles.com; Feb. 1999.

* cited by examiner

| CONTACT | SPEED DIAL | PRIVACY |
|---|---|---|
| JOHN DOE 310-555-1212 | 2 | ☑ ENABLE PRIVACY |
| MIKE CHAN 626-555-1234 | 3 | ☐ ENABLE PRIVACY |
| JOE SILVER 815-555-5678 | 4 | ☑ ENABLE PRIVACY |
| MARSHA JEFFERSON 626-555-1235 | 5 | ☐ ENABLE PRIVACY |
| JIM LEUNG 310-555-5005 | 6 | ☑ ENABLE PRIVACY |
| MARI GARCIA 949-555-4321 | 7 | ☑ ENABLE PRIVACY |
| BOB SMITH 310-555-5555 | 8 | ☑ ENABLE PRIVACY |
| MARY JAYNE 626-555-2121 | WIFE  9433 | ☐ ENABLE PRIVACY |

METHODS AND SYSTEMS FOR SPEED DIALING

CROSS-REFERENCE TO RELATED APPLICATIONS

The is a continuation of U.S. patent application Ser. No. 13/334,919, filed Dec. 22, 2011, which is a continuation of U.S. patent application Ser. No. 11/740,550, filed Apr. 26, 2007, now U.S. Pat. No. 8,085,922, which claims priority from U.S. Patent Application No. 60/796,441, filed May 1, 2006, the contents of which are incorporated herein by reference in their entirety.

STATEMENT REGARDING FEDERALLY SPONSORED R&D

Not applicable.

PARTIES OF JOINT RESEARCH AGREEMENT

Not applicable.

REFERENCE TO SEQUENCE LISTING, TABLE, OR COMPUTER PROGRAM LISTING

Not applicable.

BACKGROUND OF THE INVENTION

1. Field of the Invention

The present invention relates generally to telecommunications and in particular, to systems and methods for placing a call from a calling to a called party.

2. Description of the Related Art

In conventional telephone networks, users have the ability to place calls by dialing the phone number of the party to be called. In some cases, the network can be programmed by the user to speed dial or abbreviated dial frequently called numbers. For example, one conventional speed dialing service allows a user to place a call to several (e.g., 8 or 30) local and long distance numbers from a conventional phone in a user's home by dialing just one or two digits. A customer lifts the phone receiver, listens for dial tone, presses the code (e.g., 2 through 9) for the number to be dialed, and then presses "#".

One reason existing conventional solutions have not gained sufficient popularity is that many users find it difficult to remember which phone numbers are associated with which codes. In addition, the user interfaces for programming speed dial numbers are often cumbersome and difficult to use. By way of illustration, in the example conventional speed dialing service described above, the following steps are needed to program a speed dial number into the network.

Step 1. Lift the receiver and listen for dial tone.
Step 2. Press 7, 4, #, or *, 7, 4.
Step 3. Listen for a dial tone.
Step 4. Press the speed code (2 through 9).
Step 5. Dial the desired number.
Step 6. Listen for the confirmation tone.
Step 7. Hang up or wait for a dial tone.

SUMMARY OF THE INVENTION

Certain example embodiments are described that provide enhanced methods and systems for assigning speed dial addresses/identifiers, and for utilizing the assigned speed dials address for calling called parties. Certain optional embodiments enable a user to utilize a visual and/or audible user interface in assigning speed dial numbers/text. Optionally, a user interface may be presented to the user via a personal computer or other terminal.

BRIEF DESCRIPTION OF THE DRAWINGS

Embodiments of the present invention will now be described with reference to the drawings summarized below. These drawings and the associated description are provided to illustrate example embodiments of the invention, and not to limit the scope of the invention.

DETAILED DESCRIPTION OF PREFERRED EMBODIMENTS

Figure 1:
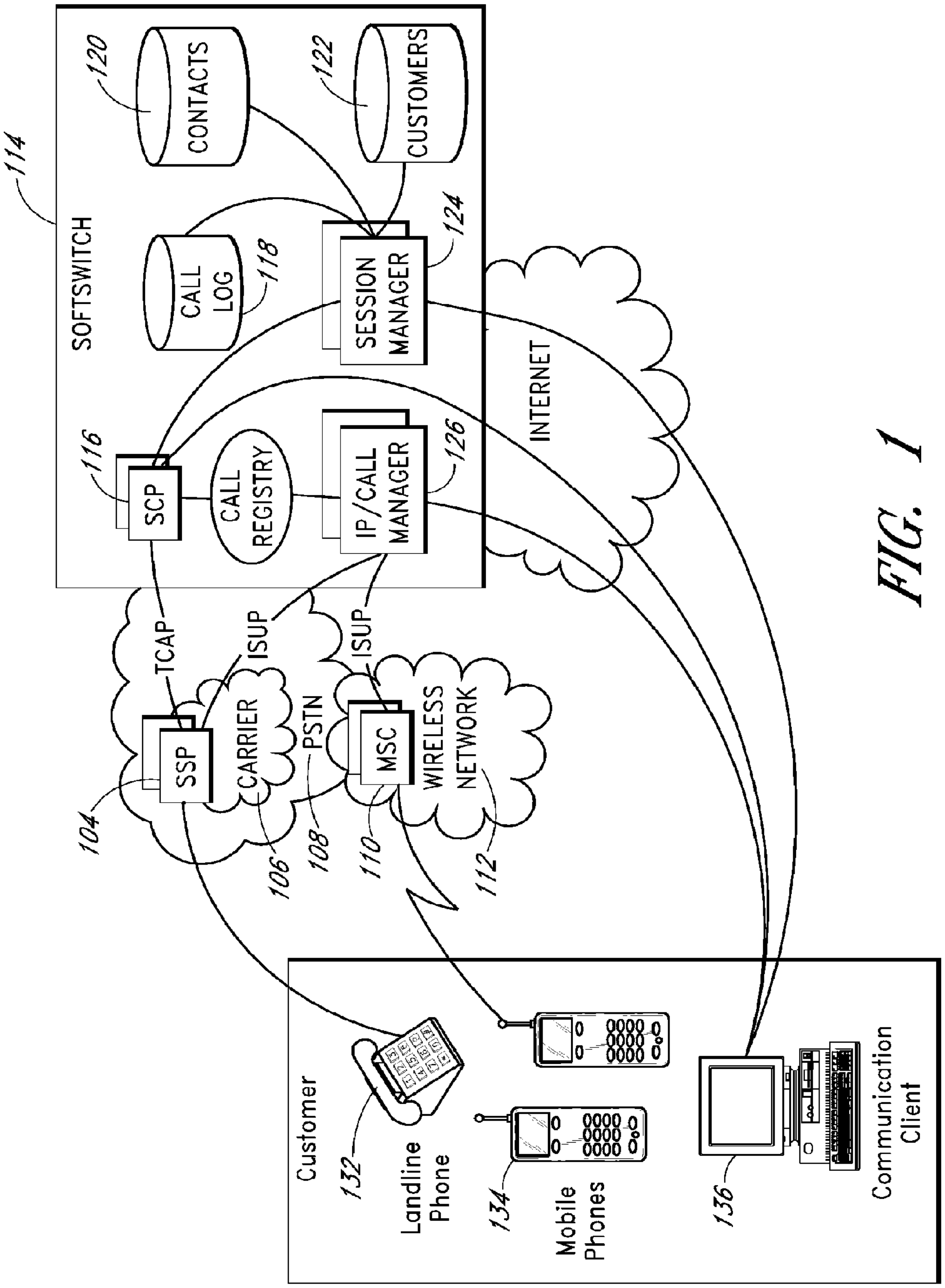
FIG. 1 illustrates an example network operating environment for advanced telecommunications services.

Embodiments of the present invention provide methods and systems that enable a user to configure and use network-based speed dialing services. In contrast to many conventional user interfaces, certain example embodiments of the configuring processes and apparatus disclosed herein optionally take advantage of a networked terminal (e.g., hosting a telecommunications client and/or a browser) connected to the telephone network over a data network, such as the Internet or other packet network.

In addition, certain embodiments use the SS7 Advanced Intelligent Network (AIN) interface in the switches of service providers to personalize the speed dial list for a landline phone using a user's contact information. Optionally, a user, such as a customer, may specify a speed dial address (e.g., a number and/or character string, sometimes referred to as an identifier) for a contact via a Web page hosted by a website, or via a telecommunications client. In an example embodiment, at least partly in response, a softswitch, acting as a Service Control Point (SCP) in the SS7 network, sends a non-call related message to the service provider's Service Switching Point (SSP) to request a change in the customer's speed dial list, which is stored on the SSP or on a system coupled to the SSP. The customer can then, optionally, pick up their phone and dial the speed dial number (e.g., one or more digits/letter combinations) to originate a call to that contact.

While certain example scenarios described herein use circuit switched SS7-based networks, other networks such as, by way of example and not limitation, the Wireless Intelligent Network (WIN), WiFi, WiMax, SIP/VoIP networks, or future networks, can also be used to provide speed dialing services.

Throughout the present description, the term "website" or "Web" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networked interactive televisions, and other protocols may be used as well.

Further, while the present description refers to example network and telephony standards and protocols, other standards and protocols can be used as well. In addition, while references may be made to electronic address books or contact lists, other data stores and formats can be used to store contact information. While certain condition monitors, such as intelligent network triggers or provisioning interfaces are referred to herein, other triggers, events, or provisioning interfaces can be used as well.

In addition, unless otherwise indicated, the functions described herein may be performed by executable code and instructions stored in computer readable memory and running on one or more processor-based systems. However, state machines, and/or hardwired electronic circuits can also be utilized. Further, with respect to the example processes described herein, not all the process states need to be reached, nor do the states have to be performed in the illustrated order. Further, certain process states that are illustrated as being serially performed can be performed in parallel.

Similarly, while certain examples may refer to a personal computer system or data device, other computer or electronic systems can be used as well, such as, without limitation, an interactive television, a networked-enabled personal digital assistant (PDA), a networked game console, a networked entertainment device, a smart phone, and so on. While certain references are made to certain example system components or services, other components and services can be used as well. In addition, while certain user inputs are described as being provided via phone key presses or by clicking on a button, optionally, user inputs can be provided using other techniques, such as by voice or otherwise. While certain phone numbers are referenced for purposes of illustration, other phone numbers or electronic addresses or locators can be used as well. Similarly, while certain speed dial numbers are referred to for purposes of illustrates, or speed dial numbers or codes can be used as well.

The term phone address can include a SIP address, a Skype address (or other peer-to-peer Internet telephony network address), a wireless phone number, an International number, an E.164 phone number, or other address. While Skype is referred to herein, other peer-to-peer telephony networks (e.g., having a decentralized and distributed user directory distributed among the nodes in the peer-to-peer telephony network) may be used as well to receive calls, place calls, and/or transfer calls. While certain phone addresses are referenced for purposes of illustration, other electronic addresses or locators can be used as well. While a SIP federated phone may be referred to, other data phone, such as an XMPP federation phone, a Skype phone (or other phone that communicates via a peer-to-peer telephony network), or other networked phone, which may be in the form of a softphone, may be used. While a speed dial number may be referred to herein, other speed dial addresses/identifiers can be used, such as those that are comprised of one or more letters or other characters.

In addition, while certain call management capabilities described herein make use of a telecommunications client (e.g., a personal computer client, a client hosted on an interactive television, a network personal digital assistant, a smart phone, or a wireless phone with an Internet connection, etc.) to give the customer access to and management of calls, other user interfaces can be accessed via a browser (e.g., see example user interfaces illustrated in FIG. 7) or otherwise. Optionally, a customer can have multiple clients and/or browsers hosted on multiple computers or other hosts.

In an example embodiment, the telecommunications client application connects to and communicates with a softswitch via the Internet, an intranet, or other network. The client application, executing on a subscriber's computer terminal or other host, can make the subscriber's online presence known to the softswitch (e.g., by transmitting a message over the Internet to the softswitch). The client can be used to receive, edit, display, and print call log data (and/or contact records) from the softswitch (e.g., a list of calls placed to/received by the subscriber, or placed by the subscriber, including phone numbers, caller or called party names, date/time of the call, an indication as to whether a call was an outbound/inbound call, the city/state of the caller/called party, type of call voice or fax, etc.), and call alert data (e.g., for an active call, listing the caller phone number, name, city/state, and/or call status (e.g., ringing, playing greeting, recording caller message, terminating call, displaying fax, etc.)). Optionally, the call alert also plays an audible signal, such as a ring tone.

The client application can display a log of recorded messages from callers, and can provide playback controls (e.g., play, pause, fast forward, rewind) for playing back or displaying the recorded message (e.g., a voice message, a video message, a fax message, etc.) via the client computer terminal. The client optionally can also be used to screen calls (e.g., wherein the softswitch streams a message being left by a caller to the client so that the called party can listen to the message in substantially real time) and to instruct the softswitch to accept calls on the host computer terminal, forward calls, refuse calls, initiate call conferencing, and to otherwise provide call handling instructions.

Figure 7:
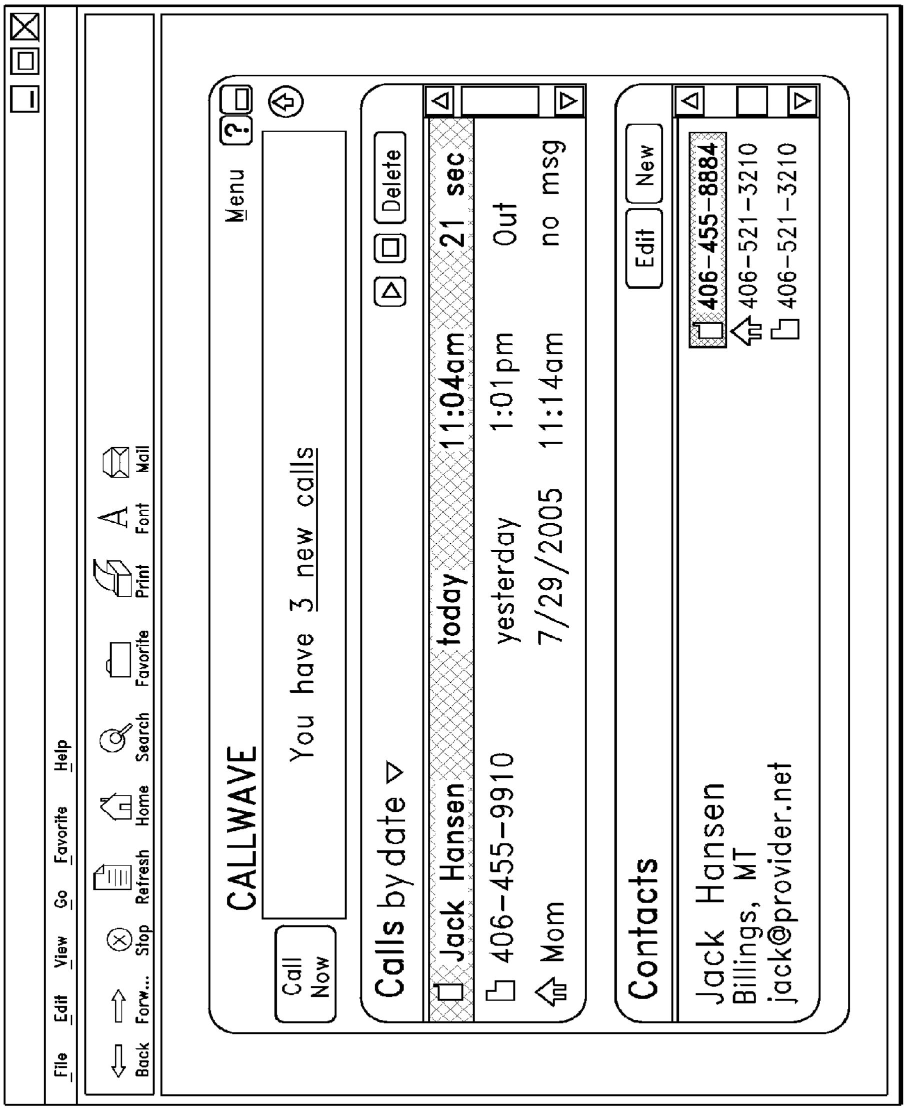
FIG. 7 illustrates still another example user interface of a call log displayed via a web browser.

A telecommunications client is a non-limiting example of a user interface. FIG. 7 illustrates another example call log user interface presented via a browser to a customer. The browser can be executing on a computer terminal, such as a personal computer, a Wireless Application Protocol (WAP)-enabled phone, a PDA, interactive television, or the like. The call log can be accessed by supplying the appropriate URL to the browser (e.g., manually, via a link, or by the terminal automatically populating the browser address field), and optionally providing, automatically or manually, log-on information, such as a user name and a password.

Enhanced service providers, such as CallWave, have emerged, providing new features and functions on ordinary phone calls. By way of example, CallWave provides call screening and transfer features that enhance the customer's calling experience, such as those described in U.S. Pat. No. 7,103,167 filed May 16, 2003, the contents of which are incorporated herein in their entirety by reference. Other embodiments of portability services are described in U.S. patent application Ser. No. 11/433,061, filed May 12, 2006, entitled "Systems and Methods for Telecommunications Address Portability," the contents of which are incorporated herein in their entirety by reference. Other embodiments of related call management functions—call logging, caller name, call screening, fixed-mobile converged routing, privacy management, and bridged outcall—some or all of which can be applied in offering this service, are described in the following patent applications, the contents of which are incorporated by reference in their entirety:

U.S. patent application Ser. No. 11/366,989, filed Mar. 2, 2006, entitled "Methods and Systems for Creating a Dynamic Call Log and Contact Records";

U.S. patent application Ser. No. 11/685,678, filed Mar. 13, 2007, entitled "Methods and Systems for Personalizing Calling/Caller Name";

U.S. patent application Ser. No. 11/374,390, filed Mar. 13, 2006, entitled "Systems and Methods for Call Screening";

U.S. patent application Ser. No. 11/480,277, filed Jun. 30, 2006, entitled "Methods and Systems for Call Routing via a Telephone Number";

U.S. Provisional patent application Ser. No. 11/686,841, filed Mar. 15, 2007, entitled "Methods and Systems for Processing Calls Having Private Caller Identification in a Telecommunications System";

U.S. Provisional patent application Ser. No. 11/676,933, filed Feb. 20, 2007, entitled "Methods And Systems for Providing Call Screening Using Network Triggers".

The functionality, operation, and implementation for an example speed dial service will now be described in detail.

GLOSSARY

AIN—Advanced Intelligent Network
CP—Carrier Partner
IP—Intelligent Peripheral
MMS—Multimedia Messaging Service
MSC—Mobile Switching Center
POTS—Plain Old Telephone Service
SCP—Service Control Point
SMS—Short Messaging Service
SS7—Signaling System 7
SSP—Service Switching Point
TCAP—Transaction Capabilities Application Part
XMPP—Extensible Messaging and Presence Protocol As will be described below, user interfaces are provided via which a user can assign speed dial numbers (or characters) to contacts. After a speed dial address (e.g., a single or multi-digit number or single or multi-character string) is assigned (e.g., via a visual interface, a voice interactive user interface, or otherwise), the user can enter the speed dial address (e.g., via a key press or vocally using a POTS landline phone, a mobile phone, an IP phone or otherwise), and the corresponding contact number will be automatically dialed. Optionally, the user can enter the speed dial number followed by '#' to complete the entry. Optionally, if '#' is not entered, a telecommunication system device (e.g., a switch) waits a short time period after a digit is entered, configurable by the customer or service provider (e.g., three seconds, four seconds, or other specified time period), to see if additional digits will be entered, and if addition digits are not entered within the time period, the device proceeds with a speed dial.

FIG. 1 illustrates an example advanced telecommunications network environment.

A carrier (e.g., a Carrier Partner who is a partner or has an arrangement with a third party call processing operator in providing enhanced call processing services) customer has one or more landline phones that connect to an SSP 104 (Service Switching Point) in the carrier's network 106. The user/customer may also have one or more mobile phones 134 and one or more hosts (e.g., personal computers, smart phones, interactive televisions, networked game consoles, etc.) executing a telecommunications client 136. The telecommunications client 136 has one or more user interfaces that optionally display some or all of the following: a call log, a contact record/list, and active, in-progress calls, and speed dial assignments. The customer can elect to screen or take an active call (e.g., where the customer hears the caller recording a message by the softswitch via a half-duplex streaming of the message to the client 136, but where the caller cannot hear the customer). Optionally, calls can also be made via the telecommunications client 136 (e.g., where the host is equipped with a speaker and microphone).

Some or all of the foregoing client capabilities can optionally be provided via one or more web pages, widgets, gadgets, or other user interfaces. Further, optionally a subscriber can configure certain aspects of their account, such as speed dial assignments, ringback signal assignments, busy signal assignments, call routing priorities and/or other instructions, via the telecommunications client 136, an account configuration/set-up web page (e.g., hosted by the softswitch 114), a widget, a gadget, or otherwise.

A speed dial address assignment is optionally configured by using the contact list accessible from the telecommunications client 136, via a Web page (e.g., part of a website hosted by the softswitch or carrier), or otherwise. When a contact is added or edited, each phone number entry for the contact has the option of specifying a speed dial address and attributes (e.g., private caller ID enabled on an outcall). A drop down list (or other presentation) of available speed dial numbers/addresses is presented from which the customer can select. By way of example, optionally, one of the entries is "None". If there is a limit on the number of speed dial numbers (e.g., a limit imposed by the carrier and/or the softswitch operation), and the limit has been reached, a notification indicates that no more speed dial numbers are available (e.g., "None available") is presented to the customer (e.g. via the telecommunications client or a Web page).

A speed dial number may optionally be configured through a telephone user interface. For example, if a user attempts to use a speed dial number (e.g., presses a telephone key for longer than a predetermined amount of time, enters no more than a certain number of digits and pauses, enters no more than a certain number of digits and presses the '#' key) to place a call, and a speed dial number has not been configured for the entered digits, the softswitch 114 prompts the caller (e.g., via a synthesized voice or prerecorded message) to enter (e.g., via a key press or by audible speech) a speed dial number in this non-configured situation. The number entered will be optionally be synchronized with one or more telecommunication clients running on one or more of the user's terminals.

A customer may optionally configure their speed dial number by sending, forwarding, or replying to an SMS or MMS message (or other messaging service, such as an instant messaging service) to a unique address. For example, if a user sends an SMS text message to "*2" and includes a phone number in the body of the message. The message is routed to the softswitch which parses the message and updates/replaces the second entry in the customer's speed dial list.

Speed dial destination phone addresses can include, by way of example and not limitation, a SIP address, a Skype address, an XMPP address, other IP device address, a wireless phone number, an International number, or an E.164 phone number. Furthermore, the network used by the softswitch to receive or place calls can include, but are not limited to the PSTN, a wireless network, and/or VoIP network.

In this example, the softswitch 114 has one or more components, some of which are optionally centralized at a given location, others of which may be co-located in the carrier's network (e.g., to reduce network transport costs). The SCP 116 (Service Control Point) is an AIN component that interacts with the SSPs 104 (e.g., using the TCAP protocol). AIN triggers are optionally armed for the customer's landline phone number/address/account so that when calls are made to or from that phone 132 (e.g., a POTS landline phone that communicates via a switched circuit network such as the PSTN 108), a trigger fires and causes the SSP 104 to query the SCP 116 for instructions on how to handle the call. The SCP 116 is optionally also configured to perform TCAP queries to other SS7 components as needed by some services (e.g., request Automatic Callback from another carrier's switch when a line becomes idle) or to provision certain features.

In another embodiment, SS7 Wireless Intelligent Network (WIN) triggers and features are set in the mobile switches of Wireless Carrier Partners to provide similar calling services but for a customer's mobile phone number/address/account.

The softswitch 114 also optionally contains one or more systems 126, referred to herein as call managers. The call managers 126 are connected to the PSTN 108 (e.g., via ISDN using the ISUP (ISDN User Part) protocol, by way of example). The call managers 126 service or provide some or all of the following: provide a call screening service when screening is to be provided, record a message from a caller that is to be recorded, provide a voice prompt or message that is to be played to a caller and/or called party, record a facsimile document that needs to be recorded in a database, detect speech or DTMF tones, convert speech that needs to be converted to text, and/or provide an inbound/outbound gateway between the SS7 network and SIP networks. The example call manager 126 optionally can also act as an IP (Intelligent Peripheral), another AIN component that the SCP 116 can instruct the SSP 104 to connect into the call for interaction with the called and calling party. The IP/call managers 126 and SCPs 116 in the softswitch 114 optionally share a Call Registry that stores information about active calls.

The session managers 126 in the softswitch 114 track telecommunication client 136 presence and interact with a given telecommunications client 136 (e.g., a personal computer client) as call log, contact, and/or customer data need to be synchronized with the centralized databases to provide the customer, via the client 136, with updated log, contact, and/or customer data. The session managers 126 also optionally provide the SCP 116 with service configuration information for the customer involved in a call. During an active call, the SCP 116 and/or IP/call manager 126 optionally directly interact with the telecommunications client 136 to provide call progress information, and to stream audio to the client 126.

The softswitch 114 in this example contains centralized databases and/or general-purpose storage areas, optionally including, but not limited to, some or all of the following: a call log database 118, a contacts database 120, and a customer database 122. The call log database 118 stores call events and related data for incoming and outgoing calls. The contacts database 120 stores information and parameters (e.g., names, identifiers, and/or phone numbers/addresses, etc.) associated with a called or calling party. The customer database 122 stores information and parameters (e.g., account data and configuration information) associated with subscribers/customers. A customer account can be enabled for the speed dial service in the customer database 122. In addition, speed dialing assignments are optionally also stored (e.g., the assignment of one or more key pad numbers or characters to a phone number) in the contacts database 120, the customer database 122 (e.g., in association with a customer account), and/or other databases.

The softswitch call processing system 114 optionally includes one or more other subsystems, such as some or all of the following: a router subsystem, which serves as an interface to the Internet to manage communications between online IP client devices and one or more call processing servers, a web server subsystem to manage a "website" associated with the softswitch 114 (e.g., via which a user can access an account set-up/configuration user interface, a speed dial assignment user interface, a call log 118, a contacts database 120, etc., using a browser or other network user interface), etc. These foregoing subsystems are optionally interconnected via a Local Area Network (LAN), a Wide Area Private Network (WAN), and/or a Wide Area Public Network (e.g., Internet).

The call manager 126 can communicate with the mobile phones 134 across the PSTN 108 over a wireless network 112 via the corresponding MSC 110. The softswitch 114 (e.g., via the call manager 126 and session manager 124) can communicate over the Internet 128 with telecommunications client 136, browsers, widgets, etc.

Figure 2:
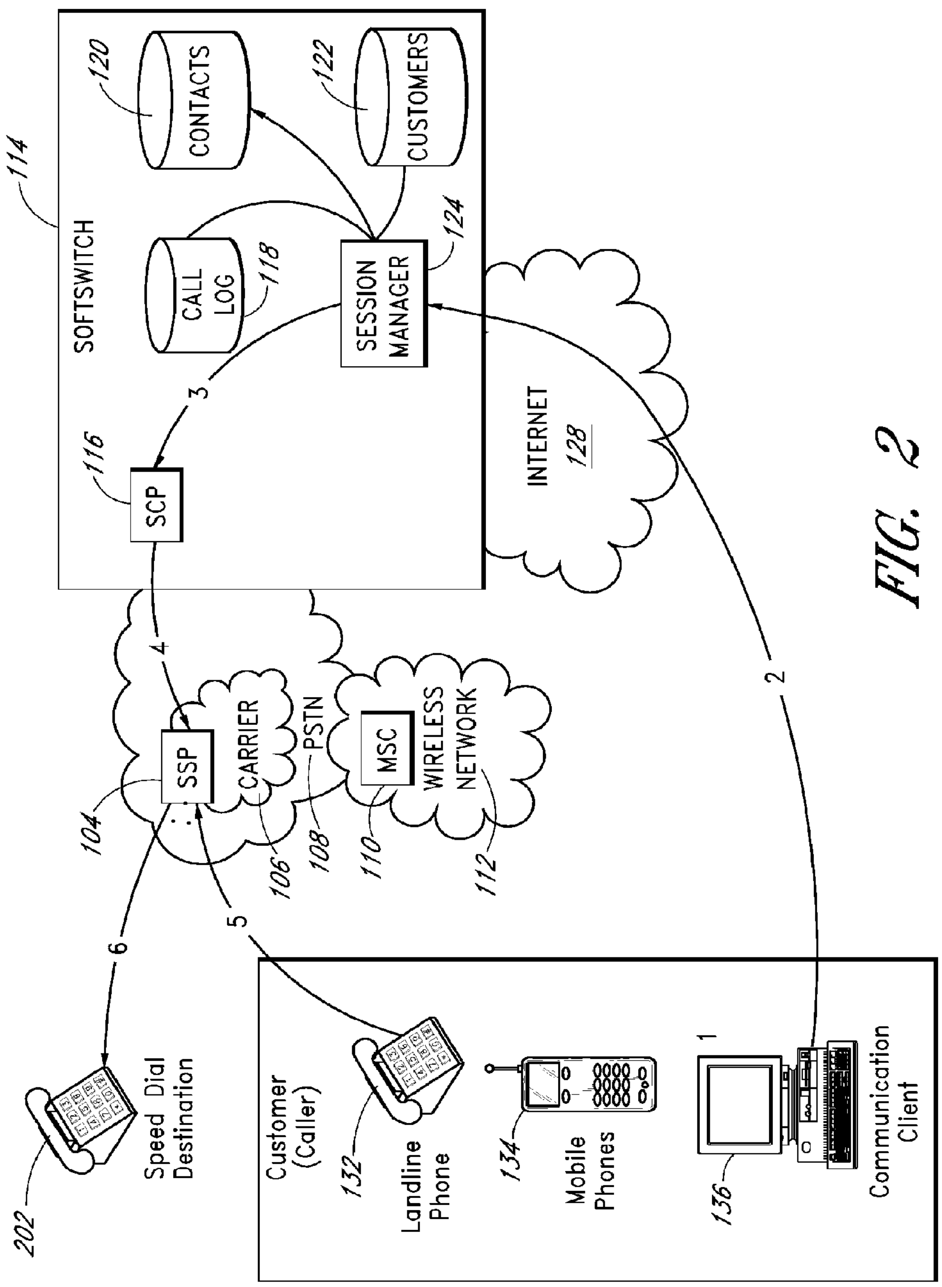
FIG. 2 depicts an example speed dialing process.

FIG. 2 depicts an example scenario in which a customer configures a speed dial number for a contact (e.g., a frequently called contact, such as, by way of example, a spouse's work phone) and then dials the speed dial number from their landline phone 132 (e.g., a landline phone connected to a telephone line assigned to the customer). The example call handling sequence scenario of FIG. 2 is now described in more detail:

State 1. A customer, using a telecommunications client 136 (or a Web page accessed from the softswitch 114, optionally after logging in to the customer's account by providing a password and/or a user ID, or via a widget or plug-in), edits the contact list entry for the customer's spouse and enters '2' (or other number/letter combination) as the speed dial number or code for the spouse's work phone. By way of example, this contact entry may have been manually entered or may have been automatically created in the customer's address book or contact list when the spouse called home previously. In this example, the telecommunications client 136 is hosted on a personal computer, although, as similarly described above, the telecommunications client 136 can be hosted on other terminal types, such as an interactive television, a smart phone, a game console, or other host.

Optionally, the customer can also specify a privacy designation (e.g., block or do not block Caller ID) for each speed dial (e.g., so that when a corresponding speed dial is dialed, the customer's phone number will or will not be displayed to the dialed party via a display (e.g., a caller ID display) in accordance with the privacy designation). The privacy designation is stored in association with the corresponding speed dial entry. This enables the customer to selectively and, for future calls, automatically enable/disable caller ID blocking for different called parties.

State 2. The telecommunications client 136 optionally stores the new speed dial number in memory (e.g., a hard disk drive) on the host, and then synchronizes with a contacts database 120 (e.g., hosted on the softswitch 114) via the session manager 126 to store the new speed dial number assignment data in the contacts database 120 for broader access by the customer (e.g., via a browser or a telecommunications client 136 on a different host).

If the customer entered the speed dial number as a character string (e.g., the spouse's initials to make the speed dial assignment easier to remember), optionally the session manager 126 automatically translates the character string into corresponding key pad numbers (e.g., A, B, C=1, D, E, F=2, etc.), and stores the corresponding number(s). Optionally, the translation is transmitted to the client 136 for display to the user.

State 3. The session manager 124 identifies/recognizes the speed dial change (e.g., by comparing the new speed dial assignment with a previous speed dial assignment or lack of assignment), which triggers the session manager 124 to cause a message request to be transmitted to the SCP 116 to update a corresponding speed dial list in the Service Switching Point (SSP 104) servicing the customer's landline phone 132.

State 4. The SCP 116 sends a message (e.g., an AIN Update message) to the SSP 104 requesting to add or activate a '2' speed dial entry for the customer's line. The SSP 104 stores this information in a database containing the customer's account settings (e.g., in a speed dial table).

State 5. Sometime later, the customer picks up their landline phone 132 and dials '2' (or provides an equivalent command, e.g., a voice command), wherein the '2' key press is held for a period previously designated by the carrier and/or the customer (e.g. via the client 132, a web page, a widget, or otherwise), and/or the key press is followed by '#' or other key press designated by the carrier. Optionally, if '2' is dialed via a voice command, if the customer speaks the number '2' and is quiet for a designated period of time (e.g., designated by the carrier and/or the customer), the carrier interprets the number as a speed dial number. In addition or instead, if the customer states a specified phrase prior to and/or after speaking the speed dial number (e.g., the phrase "speed dial") the carrier interprets the spoken number as a speed dial number.

State 6. The SSP 104 or telephonic device 132 interprets the dialed number as a speed dial number (e.g., because the key press was held for a designated period of time and/or because the dialed number was followed by a "#" key press; Optionally, if '2' is dialed via a voice command, if the customer speaks the number '2' and is quiet for a designated period of time, the carrier interprets the number as a speed dial number. In addition or instead, if the customer states a specified phrase prior to and/or after speaking the speed dial number (e.g., the phrase "speed dial") the carrier interprets the spoken number as a speed dial number.). The SSP 104 looks the dialed number up in the customer's speed dial table, and translates it to the actual phone address to be dialed. The SSP 104 connects to the actual phone address (e.g., the spouse's work phone 202) and the ringing of the actual number begins.

In an optional embodiment, at state 5 above, when the customer picks up their landline phone 132, this optionally triggers the transmission of a message from the SSP 104 using a protocol (e.g., Transaction Capabilities Application Protocol (TCAP)) to the SCP 116. In response, the SCP 116 optionally connects the IP/Call Manager 126 to detect the customer entered speed dial command (e.g., dialed "2" or spoken command). Upon receipt of a command including the phone address associated with the customer selected speed dial identifier, the SCP 116 sends a message to the SSP 104 directing the SSP 104 to route the outbound call to the phone address associated with the customer selected speed dial identifier and to optionally set other conditional triggers for this call (e.g., O_Answer and O_Discconect_Called).

The SSP 104 dials the called party phone number/address and presents ringback (the audible ringing that is heard on the telephone line by the calling party after dialing and prior to the call being answered at the distant end) to the customer. The called party answers the phone, and the answer condition triggers an event (e.g., O_Answer), which optionally results in a notification message regarding the answer condition being transmitted from the SSP 104 to the SCP 116. When the call ends, a trigger (e.g., O_Disconnect_Called) fires causing the SSP 104 to optionally query the SCP 116 via query message (e.g., a TCAP message) indicating the occurrence of a call ending condition. The SCP 116 optionally responds to the SSP 104 with a message to disconnect the call (e.g., Disconnect). The SCP 116 optionally logs the call (including but not limited to some or all of the following information: the call start and end times, call duration, calling and called party identifiers/phone addresses, etc.) in the call log database 118 and updates the call frequency data for the given contact.

The call progress of the call placed using speed dial is optionally reported from the softswitch 114 over a data network (e.g., the Internet 128) to the telecommunication client 136 (and/or via a Web page) for display to the customer. Example call progress status can optionally include but is not limited to: off-hook, calling (specified number), ringing, answer, connected, caller hung up, and terminated call.

The speed dial process can operate in the following example carrier environments wherein a carrier (e.g., a carrier partner):

- identifies which customers are to have this service enabled and identifies the corresponding point code of the SSP serving the customer's landline.
- enables the speed dial (also referred to as. speed calling) feature in the SSP for a designated customer.
- enables the softswitch to administer the speed dial numbers for the customer via its SCP.
- assigns a dedicated list of PSTN routable speed dial proxy phone numbers.

Figure 3:
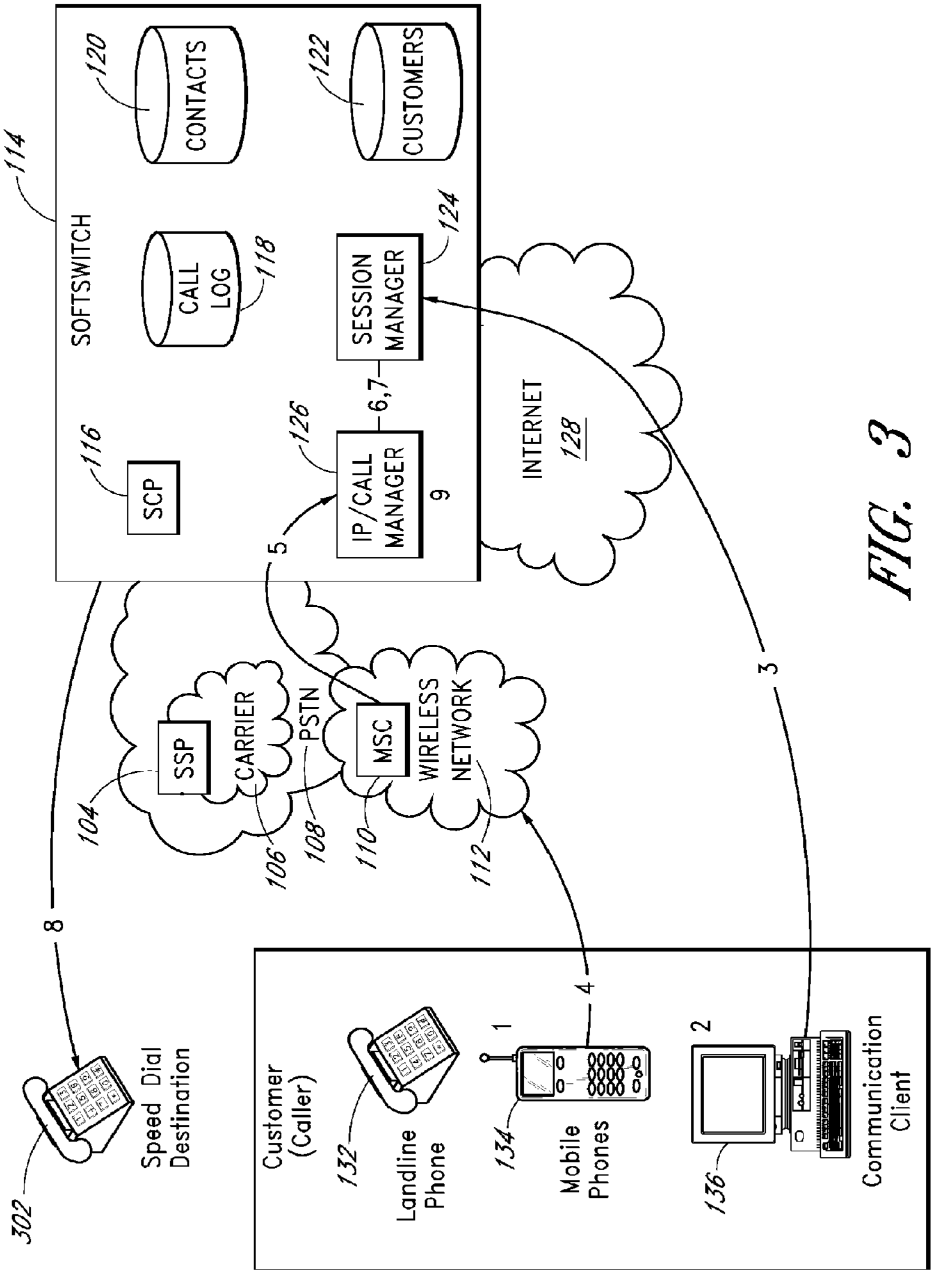
FIG. 3 depicts another example speed dialing process.

In another example speed dialing scenario, depicted in FIG. 3, a service provider pre-configures a customer's mobile cell phone to route calls to designated numbers which correspond to entries in their speed dial list. This example optionally does not utilize the SSP 104/SCP 116 integration described in the above example. This second call handling sequence scenario is now described in more detail with reference to FIG. 3:

State 1. A service provider pre-configures a customer's mobile phone 134 to speed dial a phone number that terminates on the service provider's softswitch 114. For example, a service provider can pre-configure a customer's mobile phone 134 to call the following phone numbers when the corresponding number is speed dialed:

Speed dial 0 calls 775-555-1200
Speed dial 1 calls 775-555-1201
Speed dial 2 calls 775-555-1202
Speed dial 3 calls 775-555-1203
Speed dial 4 calls 775-555-1204
Speed dial 5 calls 775-555-1205
Speed dial 6 calls 775-555-1206
Speed dial 7 calls 775-555-1207
Speed dial 8 calls 775-555-1208
Speed dial 9 calls 775-555-1209

State 2. A customer using a telecommunications client, such as client 136 (or other interface, such as a browser accessing a web page) edits the contact list entry for a given contact (e.g., the customer's spouse) and enters '2' (or other number or letter combination) as the speed dial number or code for the spouse's work phone. The contact entry may have been selected by the customer clicking on an entry in a list/table of contacts, typing a name in to a search field, or otherwise.

By way of example, the selected contact entry may have been manually entered or may have been automatically created in the address book or contact list when the spouse called home previously. Optionally, the customer can also specify a privacy designation (e.g., block or do not block Caller ID) for each speed dial (e.g., so that when a corresponding speed dial is dialed, the customer's phone number will or will not be displayed to the dialed party via a display (e.g., a caller ID display) in accordance with the privacy designation). Optionally, the customer can create new speed dial entries (e.g., Speed Dial 10 calls 775-555-1234) via a mobile phone interface or via an external user interface, such as the telecommunications client 136 hosted on a personal computer or other host (e.g., a personal computer, interactive television, smart phone, game console, etc.), via a browser, widget, gadget, or otherwise.

State 3. The telecommunications client 136 optionally stores the new speed dial number and the corresponding privacy designation, if any, in host memory (e.g., a hard disk drive. flash memory, etc.), and then synchronizes with a contacts database 120 (e.g., hosted on the softswitch 114) via the session manager 124 to store the new speed dial number assignment data in the contacts database 120 for broader access by the customer (e.g., via a browser or a telecommunications client 136 on a different host). If the customer entered the speed dial number as a character string (e.g., the spouse's initials to make the speed dial assignment easier to remember), optionally the session manager 124 translates the character string into corresponding key pad numbers (e.g., A, B, C=1), and stores the corresponding number(s).

State 4. Sometime later, the customer picks up their mobile phone 134 and dials '2'.

State 5. A call is placed from the wireless provider (e.g., via the wireless network 112) to a pre-configured number established by the service provider. In this example, a call is placed to 775-555-1202. The call routes through the PSTN 108 to the softswitch 114, and the call terminates on the call manager 124 using SS7 signaling or other appropriate signaling. All or selected portions of the signaling information associated with the call is received by the call manager 126 including but not limited to some or all of the following: called number (in this example, 775-555-1202), calling party number, call privacy restrictions (e.g., whether the call is designated as private, wherein a private designation causes the caller Caller ID information not to be provided to the called party), call forwarding number if any, call forwarding reason, and call jurisdiction.

State 6. The softswitch call manager 126 queries the softswitch session manager 124 to obtain service configuration, contact records, and call routing rules for the call, as desired. Signaling information associated with the inbound call is included in the query.

State 7. The session manager 124 verifies the calling phone number is that of a customer (e.g., a subscriber of a service offered by the operator of the softswitch 114 and/or other entity having an account associated with the softswitch 114), optionally by determining if the calling phone number or other identifier associated with the calling party matches a customer number in the customer database 122 (which stores customer account records). The session manager 124 identifies/recognizes the called number as a speed dialing proxy number and retrieves the number to be called using the customer's speed dial table. The phone address to be called is passed in a message to the call manager 126.

State 8. The call manager 126 places an outbound call to the spouse's work phone, optionally configuring the SS7, or other appropriate signaling information such that the call appears as if it is originating from the mobile phone 134 with the privacy indicator set to that specified in the speed dial table (or if privacy is not specified, the privacy configuration of the mobile phone or mobile phone number).

State 9. The call manager 126 bridges the inbound call and the outbound call.

Optionally, in the example above, if the customer speed dials a number before setting up a routing number, the call manager 126 will prompt the caller for a number to be called. The phone address entered by the caller will be called, stored in the contacts database 120 associated with the customer, synchronized with the telecommunications client 136, and optionally stored on the customer's host terminal (e.g., in a local contacts database).

Optionally, in the example above, if the calling phone number is not that of a customer, the call is rejected (e.g., at state 7 above by the softswitch session manager 124) with a busy signal or with a recorded error message.

Optionally in the example above, the mobile phones 134 are not pre-configured with phone number proxies. Instead, the customer may be provided with instructions on how to configure Speed Calling to the initial phone number proxies.

Optionally in the examples above, the speed dial list offers other advantages to the service provider and customer. For example, the service provider can terminate the call from the mobile caller and substantially immediately call the customer back on another network (e.g., a VoIP network which may be owned by the service provider), call the intended called party, and bridge the two calls together. This can reduce the customer's usage of minutes associated with the customer's cell phone service, and hence reduce the call cost to the customer in certain instances.

The service provider can optionally also offer other advantages to the customer beyond the convenience of calling using abbreviated dialing. For example, all or selected phone numbers on a customer's speed dial list can be optionally designated as "free" calls, wherein the customer will not be charged for the call and/or a certain numbers of call minutes to the designated number are not charged to the customer. In another example, a call originating via a speed dial list can be enabled with active call transfer during the call. By way of example, if the call initiates on a mobile phone but later the caller is at work, the customer may transfer the active call by a command (e.g., key press 2) to their work phone (utilizing methods and apparatus described in U.S. patent application Ser. No. 10/439,601, filed May 16, 2003, and entitled "Systems and Methods for Call Screening", incorporated herein by reference). In yet another example, the service provider can optionally provide Camp-On services speed dialed calls (utilizing methods and apparatus described in U.S. patent application Ser. No. 11/734,174, filed Apr. 11, 2007, incorporated herein by reference).

As discussed above, the speed dial service can be used compatibly with other services, such as call logging/alerting, bridged outcall, and proactive camp-on, which are also described in patent applications incorporated herein by reference.

Figure 4A:
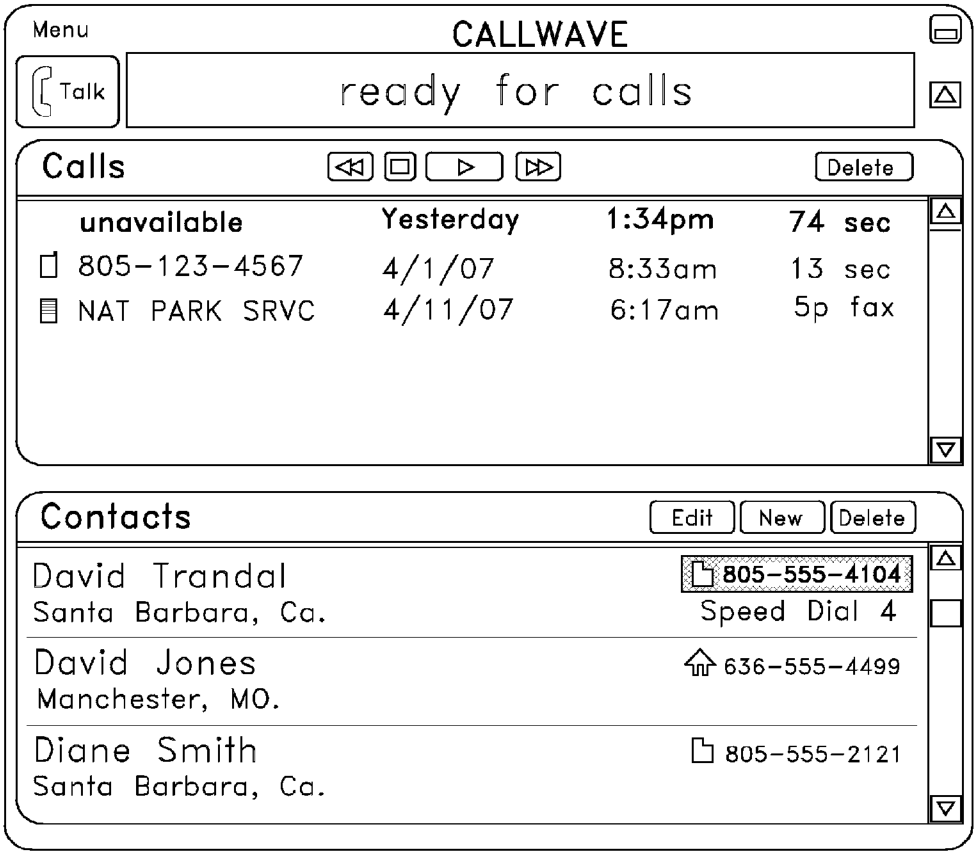
FIG. 4A illustrates an example user interface providing a call log and a listing of contacts.

FIG. 4A illustrates an example user interface which can be presented to a user by a telecommunications client hosted on a user terminal, via a Web page accessed from telecommunications service provider website, or otherwise. The illustrated user interface displays a call log, wherein a call log entry optionally includes the date and time the call was received and if the caller's phone address is not private, the source of the call (e.g., an icon indicating whether the call was placed from the user's home, work, mobile, or fax phone address), the caller's phone address and/or name or other identifier, and an indication as to whether a given caller left a message or fax and the message length (e.g., in seconds or pages, as appropriate). Controls are provided via which a user can play, fast forward, rewind, or pause a recorded message. A delete control is provided via which a user can delete one or more messages.

A contacts area displays at least a portion of a contact record for a contact (e.g., a contact corresponding to a selected log entry or otherwise selected). By way of example, the contact record can include some or all of the following: contact name, address, email address, SMS address, speed dial number(s)/letters assigned to the contact, notes, and other information. An edit control is provided, which when activated, causes the contact record to be editable, wherein the edited contact record can then be saved into the contact database discussed herein. A "new" control is provided for creating a new contact record.

A talk control is provided, which when activated enables the user to take an incoming call via the client/browser host. A status area is provided that indicates the status of a call (e.g., ringing, playing greeting, recording caller message, terminating call) to the user (if any), from the user (if any), and/or indicates whether the user interface and/or host is ready to receive and or place a call (e.g., "Ready for Calls").

Figure 4B:
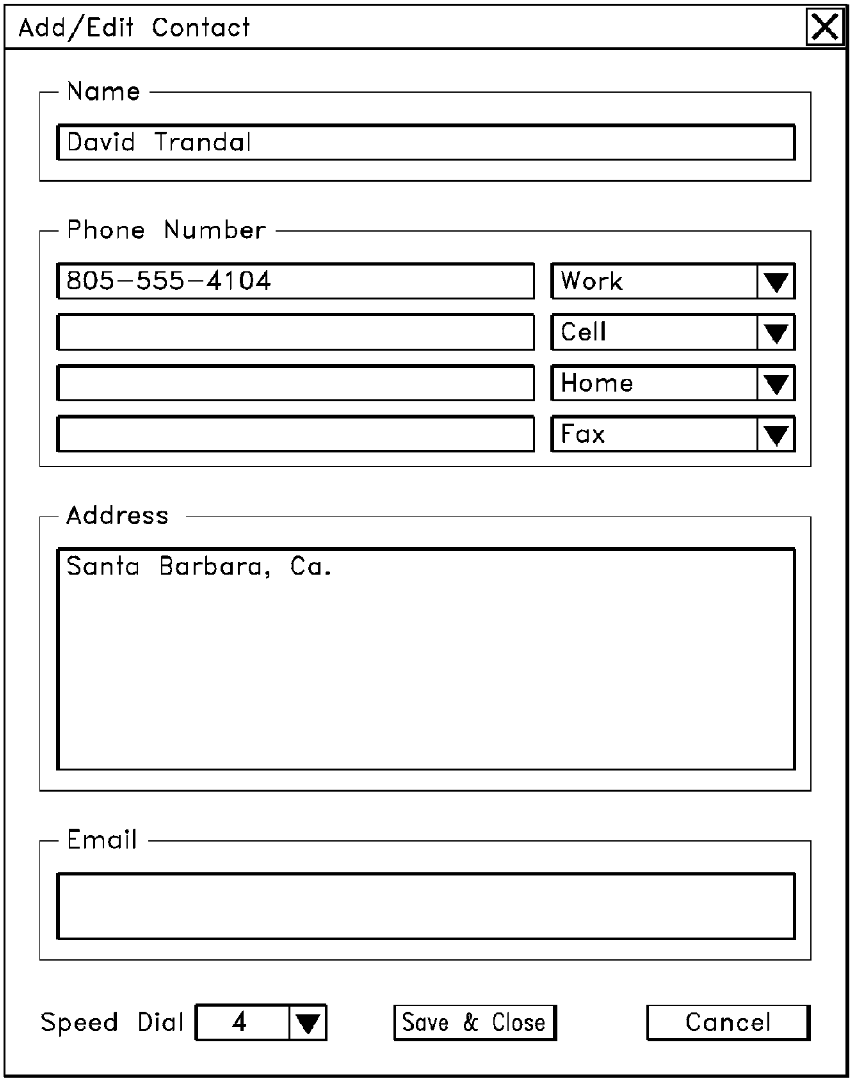
FIG. 4B illustrates an example user interface for editing a contact record.

FIG. 4B illustrates an example user interface for editing a contact. The user interface includes fields for the contact name, phone numbers, corresponding phone number types (e.g., work, cell, home, fax, Skype, other IP destination, etc.), physical address, email address, and speed dial assignment. In this example, activation of the speed dial drop down arrow will cause a list of unassigned speed dial numbers within a range of numbers (e.g., within a range of 1-9, 1-30, 10-100, etc.) to be displayed.

Optionally instead, activation of the speed dial drop down arrow will cause a list of both assigned and unassigned speed dial numbers within a range of numbers to be displayed. Optionally, the list will indicate (e.g., via text, highlighting, an icon, or otherwise) which numbers are currently assigned. Optionally, if the user selects an already assigned number, the user will be notified that the number has already been assigned and asked to confirm that the user wants to reassign the selected number. If the user elects to reassign the selected number (e.g., by clicking on an "OK" control), the reassignment will be stored by the softswitch in the appropriate database, and the updated speed dial assignments will be transmitted by the softswitch to the carrier SSP as similarly discussed above. The menu optionally lists only valid or authorized keypad number assignments (e.g., as permitted by the carrier, such as 2-9, 2-30, 2-100, etc.). Optionally, the user can specify (e.g., via an account setup parameter or a control displayed on the user interface) whether all valid or authorized keypad number assignments are to be listed, or just those that have not yet been assigned.

Figure 5:
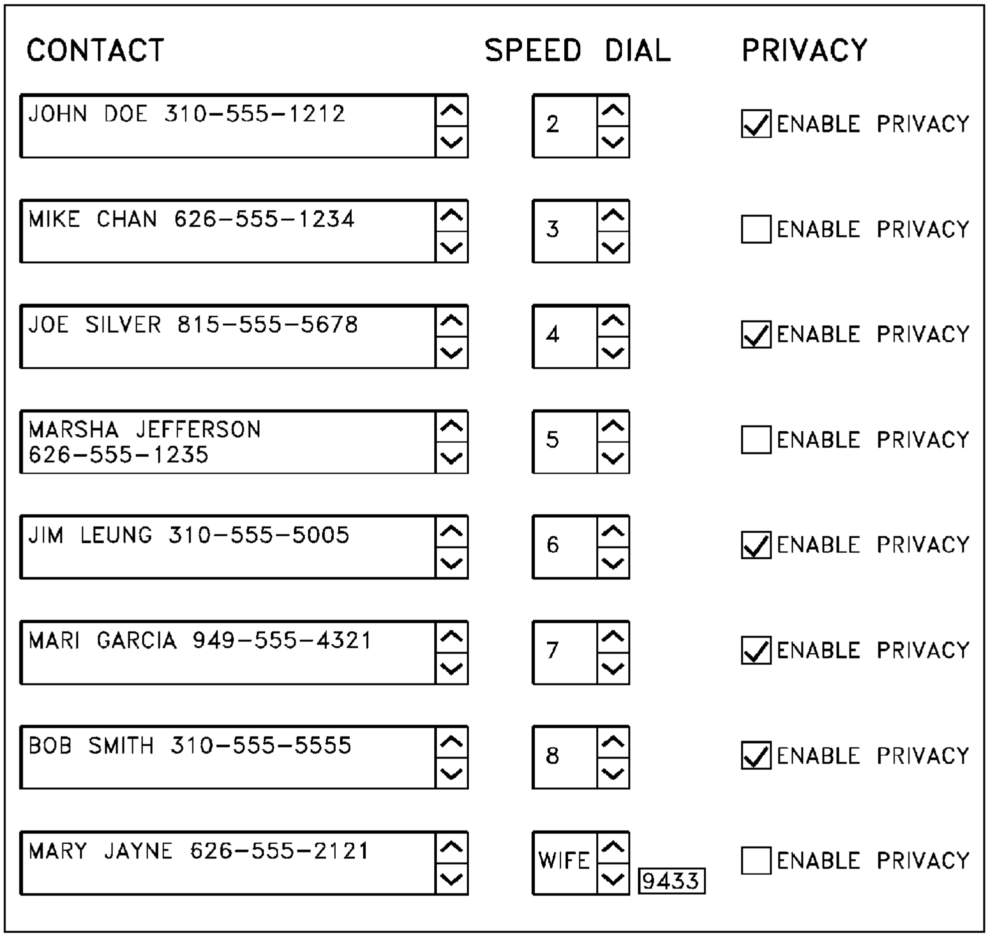
FIG. 5 illustrates an example speed dial assignment user interface.

FIG. 5 illustrates another example speed dial assignment user interface, which can be presented to a user by a telecommunications client hosted on a user terminal, via a Web page accessed from telecommunications service provider website, or otherwise. In this example, the user can select a contact via a scrollable menu listing contacts in a contacts database associated with the user. If there is more than one phone address for a given contact (e.g., home, work, and mobile phone numbers), optionally each number can be listed in the menu in association with the contact's name, or a contact record can optionally pop-up listing each of the recorded phone addresses, and optionally providing other information (e.g., SMS address, email address, physical address, etc.). Optionally, if the user wants to assign a phone address that is not in the user's contacts database, the user can manually type in the phone address and optionally a corresponding contact name and optionally activate a control to store the new contact and phone address in the user's contacts database.

Referring again to FIG. 5, a speed dial field is used via which the user can select the telephone keypad number(s) that are to be associated with the phone address selected in the contact field. Optionally, the keypad number assignment can be selected via a scrollable menu. The menu optionally lists all valid or authorized keypad number assignments (e.g., as permitted by the carrier, such as 2-9, 2-30, 2-100, etc.), or only those valid or authorized keypad numbers that have not yet been assigned (e.g., 7-9). Optionally, the user can specify (e.g., via an account setup parameter or a control displayed on the user interface) whether all valid or authorized keypad number assignments are to be listed, or just those that have not yet been assigned. Optionally, if the user attempts to assign a contact to an already assigned speed dial, a warning to that effect is presented to the user (e.g., via a dialog box), and the user is asked to confirm the new assignment or to cancel the new assignment.

Optionally, the user can type in the speed dial assignment as a number (e.g., one or more digits, such as up to 5 digits, 9 digits or other number) or as an alphanumeric string (e.g., wife, Joe, Jan, K9, etc.), as might be desirable for mnemonic purposes. Optionally, the string may be limited to a certain number of characters (e.g., 4, 6, 9, 10, 12, 15, 20, or other number of characters). Optionally, the user can be prevented or notified if the user enters a letter that is not reflected on a telephone keypad (e.g., that is not present on a POTS telephone keypad, such as the letter 'Q'). Optionally, the user can be asked if the user wants to map a letter that is not reflected on a telephone keypad to a user specified keypad number (e.g., 'Q'=7). If the user enters in a speed dial assignment that is not purely numeric, optionally the telecommunications client or system will translate the text into corresponding keypad numbers and present that translation to the user (e.g., via the client or browser), and optionally the translation will be stored in the speed dial assignment record associated with the user.

An "enable privacy" field is provided via which a user can specify whether caller ID blocking (or other privacy procedure) is to be enabled for calls to the corresponding contact. For example, if a user enables privacy for calls to a specified destination, then when a corresponding speed dial is dialed, the customer's phone number will not be provided to the dialed party (e.g., via a display, such as a caller ID display).

Figure 6:
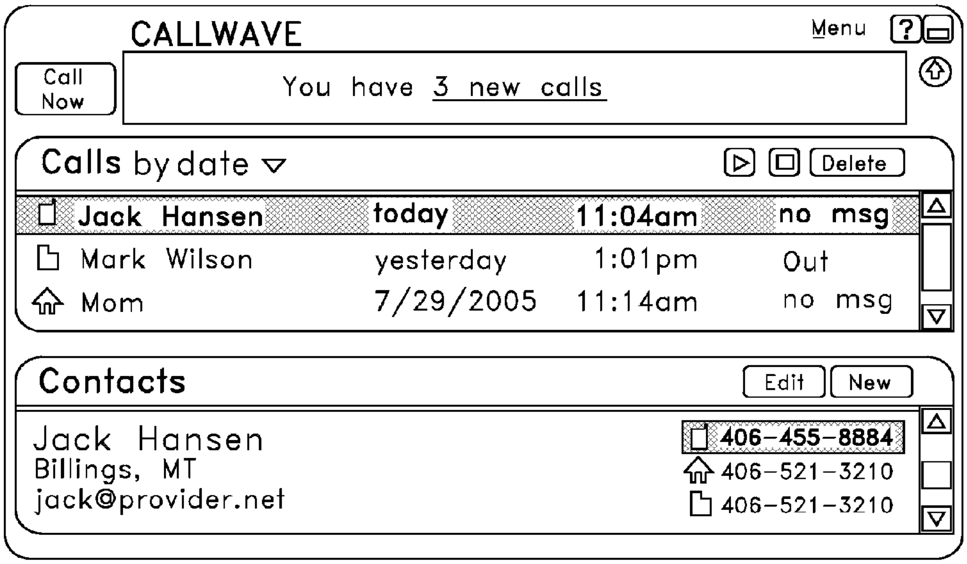
FIG. 6 illustrates another client call log and user contacts user interface.

FIG. 6 illustrates another example user interface that displays a call log, wherein a call log entry optionally includes the date and time the call was received and if the caller's phone address is not private, the source of the call (e.g., an icon indicating whether the call was placed from the user's home, work, mobile, or fax phone address), the caller's phone address and/or name or other identifier. A "new call" area displays the number of new calls the user has received. A contacts area displays at least a portion of a contact record for a contact (e.g., a contact corresponding to a selected log entry or otherwise selected). By way of example, the contact record can include some or all of the following: contact name, address, email address, SMS address, name of ringback signal assigned to the contact, notes, and other information. An edit control is provided, which when activated, causes the contact record to be editable, wherein the edited contact record can then be saved into the contact database discussed herein. A "new" control is provided for creating a new contact record. Optionally, this user interface can display a speed dial assignment, as similarly discussed above.

Optionally, the speed dial assignments performed using the example user interfaces can be used with different types of lines and telephonic devices serviced by different carriers. For example, the speed dial assignment can be used with a mobile cell phone serviced by a wireless carrier, and can be used with a landline phone serviced by a landline carrier. This enables a user to optionally utilize the same speed dial numbers across the user's telephonic devices, without having to reenter the speed dial assignments for each carrier.

FIG. 7 illustrates another example call log user interface presented via a browser to a customer. The browser can be executing on a computer terminal, such as a personal computer, a browser equipped/Wireless Application Protocol (WAP)-enabled phone, a PDA, an interactive television, a video game system, or the like. The call log can be accessed by supplying the appropriate URL to the browser and optionally providing log-on information, such as a user name and a password. Optionally, this user interface can display a speed dial assignment, as similarly discussed above.

Figure 8A:
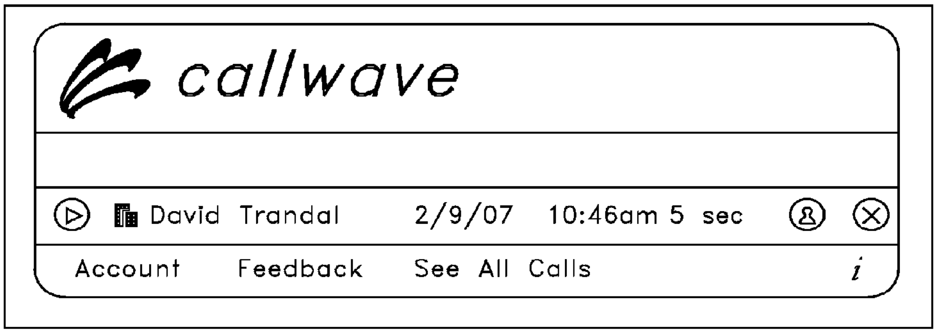
FIGS. 8A-B illustrate yet another example user interface.

FIG. 8A illustrates an example widget user interface displaying call information for the most recent received call. The user interface includes the name/identifier (if available) of the caller, the date of the call, the time of the call, and the connect time, length of message left (if any), or length of fax received (if any). An expand control is provided to expand the size and/or amount of information displayed. An account control is provided, which when activated causes an account management Web page to be presented. A feedback control is provided which, when activated, causes a form to be presented via which the user can submit feedback to the system operator/provider (e.g., like and dislikes regarding the system and services, problem issues, etc.), access a help interface, and/or access answers to frequently asked questions. A "see all calls" control is provided, which when activated, causes the user interface to list numerous past calls (e.g., all past calls, all past call received in a certain time period whose entries have not been deleted, a certain number of past calls, etc.), optionally in a scrollable user interface.

Figure 8B:
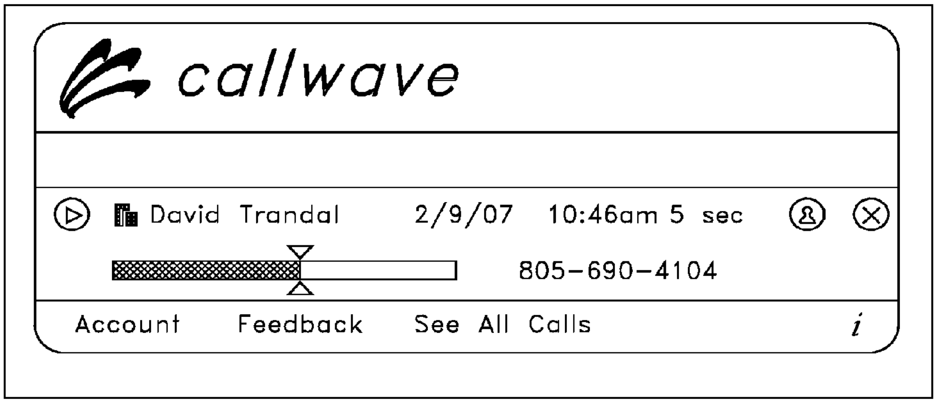

FIG. 8B illustrates an example expanded version of the user interface illustrated in FIG. 8A. The example view displays the calling number (if available) and a message playback status bar.

Thus, certain example embodiments are described that provide enhanced methods and systems for assigning speed dial addresses, and for utilizing the assigned speed dials address for calling called parties. Certain optional embodiments enable a user to utilize a visual and/or audible user interface in assigning speed dial numbers/text. Optionally, a user interface may be presented to the user via a personal computer or other terminal.

It should be understood that certain variations and modifications of this invention would suggest themselves to one of ordinary skill in the art. The scope of the present invention is not to be limited by the illustrations or the foregoing descriptions thereof.

What is claimed is:

1. A method of enabling a user to assign speed dial addresses, the method comprising providing a software program to a mobile computing device associated with a user;

for a first contact, receiving, over a network at a computer system including hardware, from the user via a user interface of the software program an association between a first phone address and a first speed dial identifier;

receiving at the computer system, from a telephonic device of the user, a user selected speed dial identifier, wherein the telephonic device of the user is different than the mobile computing device of the user and the selected speed dial identifier comprises the first speed dial identifier; and causing, at least in part by the computer system, an outbound call to be placed to the first phone address associated with the first speed dial identifier and causing, at least in part by the computer system, the telephonic device of the user to be connected with the outbound call.

2. The method as defined in claim 1, wherein the software program is a widget software program or a gadget software program.

3. The method as defined in claim 1, wherein the software program and the computer system connect and transmit information over an Internet connection.

4. The method as defined in claim 1, the method further comprising causing at least in part a contact record for the first contact to be displayed to the user via the software program, the contact record including the first speed dial identifier and a physical address.

5. The method as defined in claim 1, wherein the software program user interface includes a field via which the user can indicate if a calling phone address associated with the user is to be kept private for outbound calls placed to the respective contact.

6. The method as defined in claim 1, wherein the user selects the first speed dial identifier by speaking the first speed dial identifier into one or more user telephonic devices, the first phone address is called.

7. The method as defined in claim 1, wherein a name field is prepopulated for at least one contact record using, at least in part, a query into a name database using signaling information associated with an inbound call from the at least one contact record.

8. The method as defined in claim 1, wherein a phone address field for at least one contact record is prepopulated for at least one contact record using signaling information from an inbound call from the for at least one contact.

9. The method as defined in claim 1, the method further comprising:

receiving at the computer system a text message from the user;

parsing the text message; and associating a speed dial identifier and phone address in a contact record based at least in part on the content of the parsed text message.

10. The method as defined in claim 1, wherein the telephonic device of the user comprises a landline telephonic device.

11. A method of enabling a user to assign speed dial addresses, the method comprising:

causing at least in part a user interface to be provided over an Internet connection to a user via a user data device including a display, receiving from the user via the user interface an association between a first phone address and a first speed dial identifier for a first contact;

receiving, at a computer system including hardware, from a telephonic device of the user, a user selected speed dial identifier, wherein the telephonic device of the user is different than the user data device and the selected speed dial identifier is the first speed dial identifier; and causing, at least in part by the computer system, an outbound call to be placed to the first phone address associated with the first speed dial identifier and causing, at least in part by the computer system, the telephonic device of the user to be connected with the outbound call.

12. The method as defined in claim 11, wherein the user interface is displayed via a web browser.

13. The method as defined in claim 11, the method further comprising causing at least in part a contact record for the first contact to be displayed to the user, the contact record including the first speed dial identifier and a physical address.

14. The method as defined in claim 11, wherein the user interface includes a field via which the user can indicate if a calling phone address associated with the user is to be kept private for outbound calls placed to the respective contact.

15. The method as defined in claim 11, wherein the user selects the first speed dial identifier by speaking the first speed dial identifier into one or more user telephonic devices, the first phone address is called.

16. The method as defined in claim 11, wherein a name field is prepopulated for at least one contact record using, at least in part, a query into a name database using signaling information associated with an inbound call from the at least one contact record.

17. The method as defined in claim 11, wherein a phone address field for at least one contact record is prepopulated for at least one contact record using signaling information from an inbound call from the for at least one contact.

18. The method as defined in claim 11, the method further comprising:

receiving at the computer system a text message from the user;

parsing the text message; and associating a speed dial identifier and phone address in a contact record based at least in part on the content of the parsed text message.

19. The method as defined in claim 11, wherein the telephonic device of the user comprises a landline telephonic device.

20. A system comprising:

one or more computing devices;

at least one network interface coupled to at least one computing device;

nontransitory computer readable memory that stores program code that, when executed by the one or more computing device, causes the system to perform operations comprising:

for a first contact record, receiving via the at least one network interface from a user via a user interface of a software program resident on a mobile computing device associated with a user an association between a first phone address and a first speed dial identifier;

receiving from a telephonic device of the user, a user selected speed dial identifier wherein the telephonic device of the user is different than the mobile computing device of the user and the selected speed dial identifier is the first speed dial identifier; and causing, at least in part, an outbound call to be placed to the first phone address associated with the first speed dial identifier and causing, at least in part the telephonic device of the user to be connected with the outbound call.

21. The system as defined in claim 20, wherein the computer system is configured to connect and transmit information over an Internet connection to the software program.

22. The system as defined in claim 20, the operations further comprising causing at least in part a contact record for the first contact to be displayed to the user via the software program, the contact record including the first speed dial identifier and a physical address.

23. The system as defined in claim 20, the operations further comprising receiving via the software program user interface an indication that a calling phone address associated with the user is to be kept private for outbound calls placed to the first contact.

24. The system as defined in claim 20, wherein a name field is prepopulated for at least one contact record using, at least in part, a query into a name database using signaling information associated with an inbound call from the at least one contact record.

25. The system as defined in claim 20, wherein a phone address field for at least one contact record is prepopulated for at least one contact record using signaling information from an inbound call from the for at least one contact.

26. The system as defined in claim 20, the operations further comprising:

receiving a text message from the user;

parsing the text message; and associating a speed dial identifier and phone address in a contact record based at least in part on the content of the parsed text message.

27. The system as defined in claim 20, wherein the telephonic device of the user comprises a landline telephonic device.

28. A system comprising:

one or more computing devices;

at least one network interface coupled to at least one computing device;

nontransitory computer readable memory that stores program code that, when executed by the one or more computing device, causes the system to perform operations comprising:

causing at least in part a user interface to be provided over an Internet connection to a user via a user data device including a display, receiving from the user via the user interface an association between a first phone address and a first speed dial identifier for a first contact;

receiving, from a telephonic device of the user, a user selected speed dial identifier, wherein the telephonic device of the user is different than the user data device and the selected speed dial identifier is the first speed dial identifier; and causing, at least in part, an outbound call to be placed to the first phone address associated with the first speed dial identifier and causing, at least in part, the telephonic device of the user to be connected with the outbound call.

29. The system as defined in claim 28, wherein the user interface is provided to a web browser.

30. The system as defined in claim 28, the operations further comprising causing at least in part a contact record for the first contact to be displayed to the user, the contact record including the first speed dial identifier and a physical address.

31. The system as defined in claim 28, wherein the user interface includes a field via which the user can indicate if a calling phone address associated with the user is to be kept private for outbound calls placed to the respective contact.

32. The system as defined in claim 28, wherein a name field is prepopulated for at least one contact record using, at least in part, a query into a name database using signaling information associated with an inbound call from the at least one contact record.

33. The system as defined in claim 28, wherein a phone address field for at least one contact record is prepopulated for at least one contact record using signaling information from an inbound call from the for at least one contact.

34. The system as defined in claim 28, the operations further comprising:

receiving a text message from the user;

parsing the text message; and associating a speed dial identifier and phone address in a contact record based at least in part on the content of the parsed text message.

* * * * *